US011005915B1

(12) United States Patent
Balasubrahmanian et al.

(10) Patent No.: US 11,005,915 B1
(45) Date of Patent: May 11, 2021

(54) DATA PROVIDER AGNOSTIC CHANGE HANDLING IN MOBILE CLIENT APPLICATIONS

(71) Applicant: ORACLE INTERNATIONAL CORPORATION, Redwood Shores, CA (US)

(72) Inventors: Kaarthik Balasubrahmanian, Belmont, CA (US); Donald Creig Humes, Yorktown, VA (US); Srikanth Doddadalivatta Venkatesh Prasad, Bangalore (IN); Sridhar Tadepalli, Pleasanton, CA (US); Rajesh Ashwinbhai Shah, Redwood Shores, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 16/751,351

(22) Filed: Jan. 24, 2020

(51) Int. Cl.
| | | |
|---|---|---|
| *H04L 29/08* | (2006.01) | |
| *H04L 12/28* | (2006.01) | |
| *G06F 8/65* | (2018.01) | |
| *G06F 8/41* | (2018.01) | |
| *H04W 4/50* | (2018.01) | |

(52) U.S. Cl.
CPC .............. *H04L 67/025* (2013.01); *G06F 8/42* (2013.01); *G06F 8/65* (2013.01); *H04L 12/287* (2013.01); *H04L 67/34* (2013.01); *H04W 4/50* (2018.02)

(58) Field of Classification Search
CPC ........... H04L 67/025; H04W 4/50; G06F 8/42
USPC ............... 455/419, 418, 422.1, 414.1, 412.1
See application file for complete search history.

(56) References Cited

U.S. PATENT DOCUMENTS

| | | | | |
|---|---|---|---|---|
| 2005/0262158 | A1* | 11/2005 | Sauermann | ............ G06F 16/284 |
| 2017/0104625 | A1* | 4/2017 | Chen | ..................... H04L 69/324 |
| 2018/0357270 | A1 | 12/2018 | Balasubrahmanian et al. | |
| 2018/0357304 | A1 | 12/2018 | Balasubrahmanian et al. | |

* cited by examiner

*Primary Examiner* — Nghi H Ly
(74) *Attorney, Agent, or Firm* — Kraguljac Law Group, LLC

(57) ABSTRACT

In one embodiment, change handling in mobile client applications may be facilitated by intermediate storage of changes using a data-provider-agnostic change object schema. An input on a mobile device that indicates a create, update, or delete action on a data object stored in a remote datastore is received. In response to receiving the input, a description of the action on the data object in a syntax that is agnostic as to type of remote service provider used for interacting with the remote datastore is created. The description of the action to a syntax of the first remote service provider is converted to compose a command configured to cause a first remote service provider to execute the action. The command is transmitted over a network to the first remote service provider to cause the action to be performed on the data object in the remote datastore.

20 Claims, 9 Drawing Sheets

```
{
    AttributeName (0-n):{
                            change: "<updated|deleted|created>",
                            value: "new value"
                       },
    ChildName (0-m):{
                       type: "child",
                       children:[{
                                    type: "<updated|deleted|created>",
                                    primaryKey: primaryKeyValue,
                                    changes: {An object following the format
                                              of this change specification}
                                }]
                    }
}
```

FIG. 3

```
{
  "SrNumber": { "change": "deleted" },
  "Title": { "change": "updated", "value": "new title" },
  "ABC": { "change": "created", "value": "123" },
  "contacts": {
    "type": "child",
    "children": [
      {
        "type": "updated",
        "primaryKey": "111",
        "changes": {
          "JobTitle": { "change": "updated", "value": "New Title" },
          "XYZZY": { "change": "created", "value": "345" }
        }
      },
      {
        "type": "updated",
        "primaryKey": "222",
        "changes": {
          "PhoneNumber": { "change": "deleted" }
        }
      },
      {
        "type": "created",
        "primaryKey": "777",
        "changes": {
          "MemberId": 777,
          "Title": "Support Level 1"
        }
      },
      { "type": "deleted", "primaryKey": "123" }
    ]
  }
}
```

FIG. 4

DATA PROVIDER AGNOSTIC CHANGE HANDLING IN MOBILE CLIENT APPLICATIONS

BACKGROUND

Software applications hosted on a mobile client device ("mobile applications") commonly interact over a network with a backend (or otherwise remote) data provider hosted on a backend server to access and manipulate application data stored in backend databases. The mobile application is not able interact with the backend data provider when, for example, (i) there is poor or absent network connectivity between the client device and the backend server, or (ii) the backend server is unresponsive or unavailable.

Often, the users of the mobile application desire to access and manipulate application data when the mobile application is not able to interact with the backend data provider. Application features may therefore include the ability to operate in an "offline mode," which allows the mobile application to access and manipulate application data locally on the mobile client device while out of contact with the backend data provider. The changes to the application data are persisted locally on the mobile client device and synchronized with the backend databases when interactions with the backend data provider resume. This may be referred to as referred to as "offline write" or "deferred write access."

Currently, when a mobile application attempts to update data when in an offline mode, the changes are persisted within offline (local) data storage in a way that is tightly coupled with the schema specific to the backend data provider. While this model works, it doesn't scale when there are multiple such backend data providers with diverse and dissimilar structural representations of an entity. Mobile applications that store the changes in a way that closely follows what the schema of the backend data provider cannot connect to multiple data providers each having a unique schema to represent the object. They also cannot be altered at runtime to accommodate new entities, relationships and features that are customized to a business process. Further, if a remote system is updated while mobile application is offline and the update changes the schema or structure for changes, the stored changes may be invalid and cause synchronization to fail. Storing changes in a schema or structure specific to a remote provider are often lossy, and it may not be possible to reconstruct the original change or convert the stored change to a different format. Thus, offline changes stored in a schema or structure specific to one particular remote provider have clear disadvantages.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (for example, boxes, groups of boxes, or other shapes) in the figures represent one embodiment of the boundaries. In some embodiments one element may be implemented as multiple elements or that multiple elements may be implemented as one element. In some embodiments, an element shown as an internal component of another element may be implemented as an external component and vice versa. Furthermore, elements may not be drawn to scale.

FIG. 3 illustrates one embodiment of a schema for a data-provider-agnostic change object associated with data-provider-agnostic change handling in mobile client applications.

FIG. 4 illustrates an example data-provider-agnostic change object instance describing various changes made to an example row object instance.

DETAILED DESCRIPTION

Figure 1:
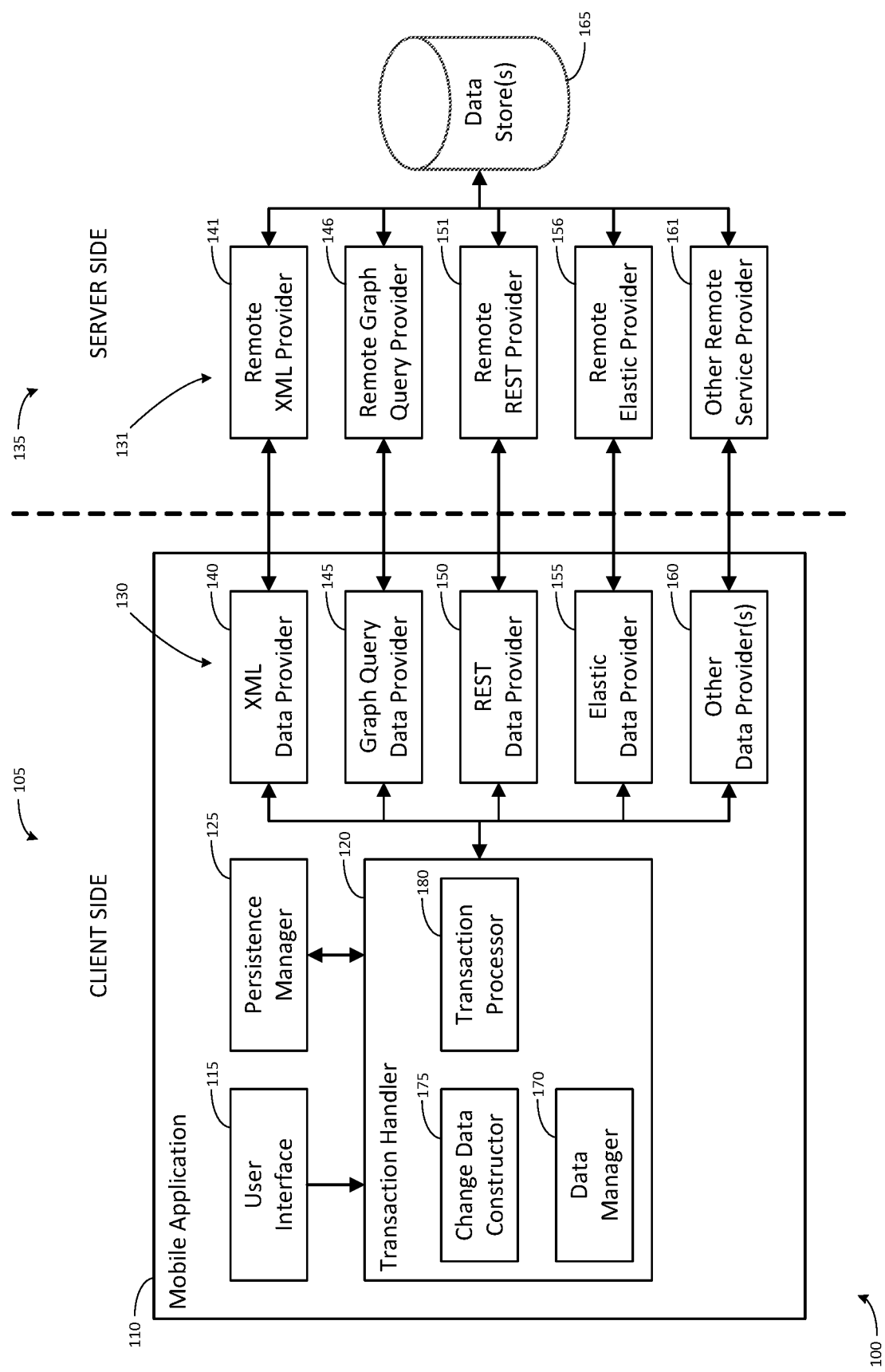
FIG. 1 illustrates one embodiment of a system associated with data-provider-agnostic change handling in mobile client applications.

Systems and methods are described herein that provide data-provider-agnostic change handling in mobile client applications. The data-provider-agnostic change handling overcomes the limitations of caching data for offline write in a schema that conforms to a schema of the backend data provider. Instead, in one embodiment, a data-provider-agnostic change object is implemented to capture updates from the mobile application. (The data-provider-agnostic change object may be referred to herein as simply a "change object" for convenience.)

The data provider-agnostic change object allows the mobile application on the client device to provide access to adjust, reorganize, correct, and merge data and features independent of the remote service provider that it is connecting to on the backend server. The data provider-agnostic change object enables the mobile application to (i) present the user with a logically consistent view of the local data and (ii) maintain individual user actions as transactions that can be tracked, applied, and mitigated individually.

In one embodiment, a mobile application is defined to include a data storage model that can be interpreted and used by the client device to store and access data and features while there is no connection to the backend server. In addition, the mobile application implements an algorithm to store changes to this data into the storage model in a way that is unique and agnostic of the provider itself. In one example, this may be the data-provider-agnostic change object. Also, the mobile application implements a change resolver that would transform the updated data into the data provider's format at the time the changes are synchronized.

The data storage model includes unique identifiers specified on the request that are included in the response from the server and are used to store that component fragment in a local store and are used to identify the specific record from a collection that have been changed.

In one embodiment, a method and system for defining an object and a data-provider-agnostic change handling mechanism within the offline synchronization model is presented. The mobile device stores a user change made while connected or disconnected and synchronizes with the remote server at a later state of time. The mobile device updates a combination of tables defined in memory in a way that optimizes data storage and real-time seamless data merge. The request is stored in memory as a location identified by a first universal identifier. The request constitutes changes that adhere to a custom, data-provider-agnostic schema and would contain a collection of keys each of which describe the operation performed along with the change itself. Upon retrieval by the local client, the modified data is merged with the original state of an object to provide a consistent local view in the application while maintaining individual transactions that can be applied, canceled or mitigated separately in the order recorded. Prior to submission to the remote server, the change data is transformed into a format governed by the remote service provider thus making the model loosely coupled with the remote system.

Mobile applications configured in accordance with the systems and methods described herein present significant improvements over prior mobile application implementations. The polymorphic behavior of Mobile applications configured in accordance with the systems and methods described herein allows the record of data changes (the change object) to not be tied to a specific schema at the time the object is created. Instead, the record of data changes is represented with a generic schema, and transformed to a different schema at the time the object is being synchronized at runtime to work with changes to the application definition on-the-fly. This is unique as compared to existing applications that use a static pre-defined model for persisting objects to the state of the object.

Mobile applications configured in accordance with the systems and methods described herein present also significant advantages. The change data object that gets created when users make a change, is independent of the schema of the object on the remote server. In one example, the system may be kept up to date based on information retrieved from multiple different types of backend data providers or other servers. For example, one data provider may represent data as a complex graph while another data provider may represent data as a simplistic hierarchical entity-entity relationship. Generally, modifications on the client are cached as is, conforming to a particular well-defined shape. This issue is addressed using a method and system to define a data-provider-agnostic change object to capture updates from the application. This model allows the client application to provide access to adjust, reorganize, correct and merge data and features independent of the remote provider its connecting to on the server. This model is able to present the user with a logically consistent view of the local data and maintain individual user actions as transactions that can be tracked, applied, and mitigated individually.

In one embodiment, the change object includes a collection of keys each of which describe the operation performed along with the change itself. Prior to submission to the remote server, the change data is transformed into a format governed by the remote service provider thus making the model loosely coupled with the remote system.

—Example System For Data-Provider-Agnostic Change Handling—

FIG. 1 illustrates one embodiment of a system 100 associated with data-provider-agnostic change handling in mobile client applications. On the client side 105, the system 100 includes mobile application 110. The mobile application 110 includes a user interface 115, a transaction handler 120, and persistence manager 125. The mobile application 110 also includes one or more data providers 130 to interface with various remote service providers 131 on server side 135. The data providers 130 may include an XML data provider 140 for interfacing with a remote XML provider 141. The data providers 130 may include a graph query data provider 145 for interfacing with a remote graph query provider 146. The data providers 130 may include a REST data provider 150 for interfacing with a remote REST provider 151. The data providers 130 may include an elastic data provider 155 for interfacing with a remote elastic provider 156. The data providers 130 may also include other data providers 160 configured to interface with other remote service providers 161. The data providers 130 interface with the remote service providers 131 by electronic communication over a network using various network communication protocols. The remote service providers 131 are connected to a data store 165 associated with mobile application 110. The transaction handler 120 includes a data manager 170, a change data constructor 175, and a transaction processor 180. In one embodiment, each of the components of the system 100 may be implemented as a module.

In one embodiment, the mobile application 110 is a client application for accessing and manipulating data stored in data store 165. For example, the mobile application 110 may be a client application for an enterprise sales and service tool that hosts data on the data store 165 and offers one or more services through remote service providers 131. In one embodiment, the mobile application 110 is an Oracle® CX mobile client. The client application may be downloaded from a third-party distributor of mobile applications, such as the Google® Play store or the Apple® store, or downloaded from systems associated with the operator of sales and service tool. The mobile application 110 may then be used for example by sales staff or service staff to browse sales opportunities or service requests, create new sales opportunities in the tool, submit service requests in the tool, look up contact information related sales opportunities or service requests, or perform other operations that create, read, update, or delete information in data store 165.

In one embodiment, the mobile application 110 requests the performance of data operations in the tool by application programming interface (API) requests to remote service providers 131. In one embodiment, the requests are requests to and from web servers (such as remote representational state transfer (REST) requests using JavaScript object notation (JSON) as the data interchange format), as may be the case with remote graph query provider 146, REST provider 151, and remote elastic provider 156. In one embodiment, the requests are SOAP requests to and from XML servers, such as remote xml provider 141. The mobile application 110 is configured to perform operations that support offline write or deferred write access when connectivity between the mobile application 110 and the data store 165 is limited or absent. The mobile application 110 may store data retrieved from data store 165 in a local cache using persistence manager 125. The data in the local cache may be manipulated by a user of the mobile application 110 while connectivity between client side 105 and server side 135 is limited or absent, and later synchronized with the server side when connectivity is restored.

In one embodiment, the user interface 115 is a graphical user interface (GUI) to mobile application 110. The GUI may include user interface elements such as images, container windows, browser windows, text terminal windows, dialogue boxes, drop down menus, context menus that become visible in response to user interaction with the graphical user interface, icons, buttons, radio buttons, checkboxes. The GUI may accept inputs from a user of the mobile application 110 for example by mouse clicks or taps on a touch screen, keystrokes from a physical or virtual keyboard, or voice-to-text. The inputs by the user may be accepted through the user interface elements. The inputs by the user may describe or indicate create, read, update, or delete operations for data objects (such as a row object). Some or all of the contents of the data object may be read and displayed to the user through the user interface 115. The operations or actions described by the inputs may be for data objects stored remotely in data store 165 or stored locally by persistence manager 125. The create, update, or delete operations described by the user inputs through the user interface 115 are presented to data manager 170 for further disposition.

In one embodiment, the transaction handler 120 includes a "commit" or "save" function that instructs the data manager to finalize the create, update, or delete operations entered by the user. In one embodiment, the user interface 115 includes a button or other interface element that, in response to selection by the user, initiates the "commit" or "save" function of the transaction handler 120.

In one embodiment, change data constructor 175 operates to create a data-provider-agnostic change object to describe a particular transaction (including create, update or delete data operations). The transaction may be one described by user inputs through user interface 115. In one embodiment, the change data constructor 175 creates the data-provider-agnostic change object in response to the execution of the a "commit" or "save" function (executed, for example, in response to a user input indicating selection the "commit" or "save" function.

In one embodiment, data manager 170 makes determinations as to where a transaction will be routed, whether locally or to remote providers, and further as to what provider will be used. For example, where there is connectivity between the client side 105 and the server side 135, the data manager 170 will route the change objects created by the "commit" or "save" function to the server side 135 to effect the changes described by the change object in the data store 165. Data manager 170 selects an appropriate data provider 130 for the routing, and sends the change object to that data provider 130 for conversion to a schema specific to the associated remote service provider 131. Or, for example, where there is limited or no connectivity between the client side 105 and the server side 135, the data manager 170 will route the change objects created by the "commit" or "save" function to persistence manager 125 to be stored locally until connectivity is restored. Or, in another example, where a remote service provider 131 to which the transaction is to be routed has low availability or no ability to process requests, the data manager 170 will route the change objects created by the "commit" or "save" function to persistence manager 125 to be stored locally until availability is restored. In a further example, where a remote service provider 131 to which the transaction is to be routed has low availability or no ability to process requests, the data manager 170 will route the change objects created by the "commit" or "save" function through a different data provider 130 to a different associated remote service provider also capable of processing the transaction.

In one embodiment, transactions are stored locally in persistence manager 125 as data-provider-agnostic change objects for later synchronization with data store 165 while (i) connectivity between client side 105 and server side 135 is unavailable or limited, or (ii) one or more remote service providers 131 have low availability or no ability to process requests. Transaction processor 180 maintains a list of each data-provider-agnostic change object stored locally, for example as a data structure in memory. The list maintains the temporal order of the change objects. When connectivity or availability is restored, transaction processor 180 retrieves the change objects stored locally from persistence manager 125. Transaction processor enforces the temporal order of change objects affecting the same row object to prevent race-condition errors. Transaction processor 180 determines how to route the transaction request to the server side 135 to effect the changes described by the change object in the data store 165. Transaction processor 180 selects an appropriate data provider 130 for the routing, and sends the change object to that data provider 130 for conversion to a schema specific to the associated remote service provider 131.

In one embodiment, each data provider 130 operates to create instructions to effect the changes described by a received change object using a schema or structure specific to the data provider's respective remote provider 131. Each data provider 130 maintains a copy of the syntax for interacting with the data provider's respective remote provider 131. Each data provider 130 maintains a copy of the definition of the data types accepted by the data provider's respective remote provider 131. In one embodiment, the syntaxes and definitions are maintained in local storage through the persistence manager 125. Each data provider 130 operates to create instructions to effect the changes using the appropriate syntax and data types for the data provider's respective remote provider 131.

For example, in response to receiving a change object from data manager 170 or transaction processor 180, REST data provider 150 creates an instruction to effect the changes described by the change object using a remote-REST-provider-specific description of the transaction. For example, a REST request with a payload describing the change in a schema specific to the REST data provider 150 by remote rest provider 151 may be created. The REST data provider 150 converts the actions described by the change object to instructions in the syntax for interacting with the remote REST provider for modifying an object of a data type described by the definition for the remote REST provider. The REST request may then be transmitted by the REST data provider 150 to remote REST provider 151 over a network connection between the client side 105 and the server side 135 of the system 100.

In one embodiment, the remote service providers 131 are interfaces (such as APIs) on top of the database or data store 165 of the system 100. The remote service providers accept API requests (from data providers 130) and executes queries on data store 165 to effect these requests. The remote service providers 131 can also return information retrieved from data store 165 through the data providers 130 to the remote application 110 for various purposes, such as display by user interface 115.

In one embodiment, the remote service providers 131 all have access to the same data (from data store 165) on the system 100. But, the different remote service providers 131 may not share the same capabilities. Some may not accept posts at all, some may accept posts for certain changes, but not for other changes. Some remote service providers 131 may be more performance oriented in one case or another.

In one embodiment, the data store 165 is an Oracle® database connected to an application server that exposes one or more of the remote provider 131 interfaces to the network. In one embodiment, the application server is an Oracle® WebLogic® application server.

In one embodiment, the server side 135 may be remotely located from the client side 105. As discussed above connection between the client side 105 and the server side 135 may be intermittent. The data providers 130 and remote service providers 131 operate to synchronize data operations (such as create, update, and delete operations) performed by the mobile application 110 where the client side 105 has been out of communication with and server side 135.

—Example Environment for Data-Provider-Agnostic Change Handling—

Figure 2:
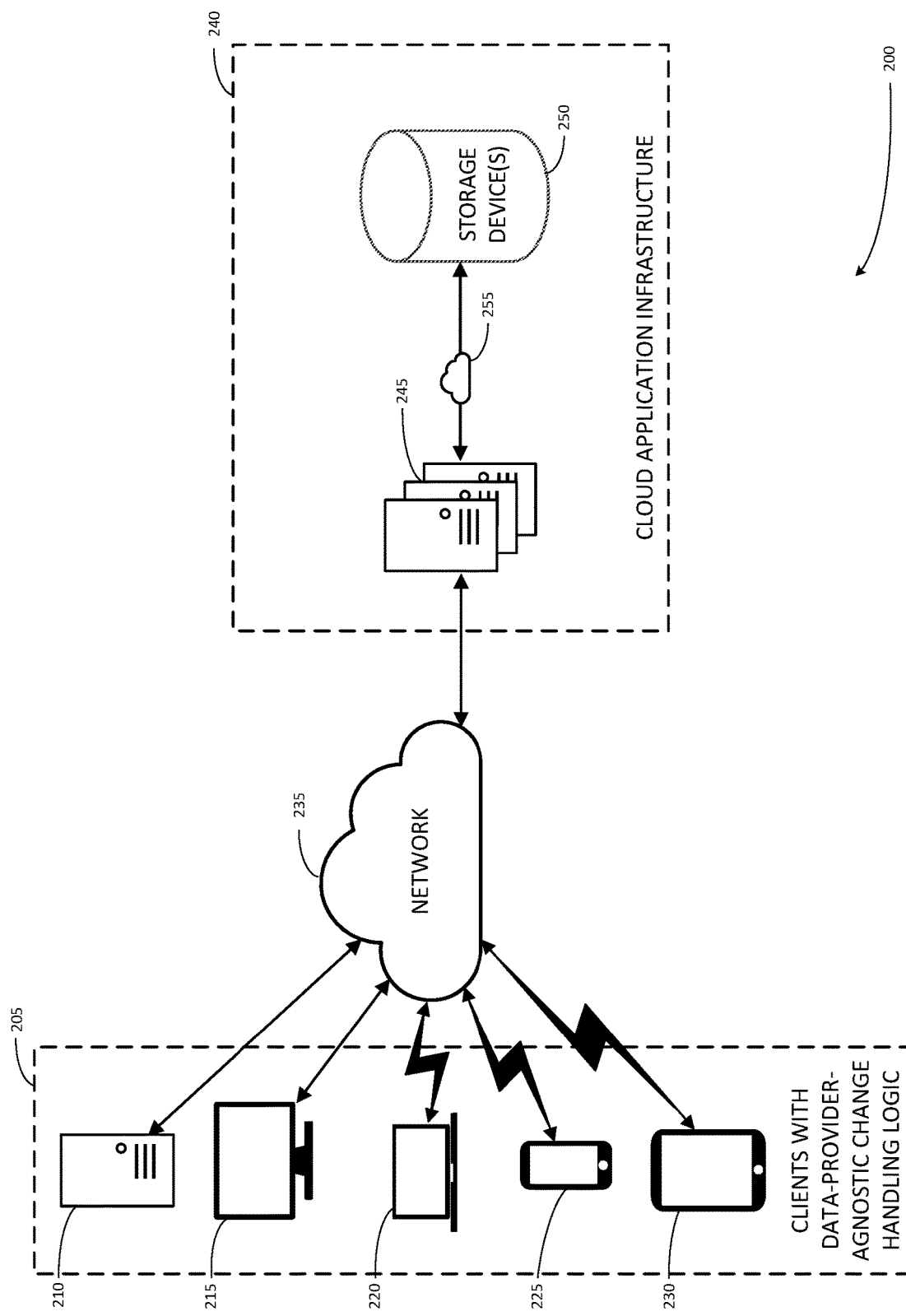
FIG. 2 illustrates one embodiment of an environment associated with data-provider-agnostic change handling in mobile client applications in which the system may operate.

FIG. 2 illustrates one embodiment of an environment 200 associated with data-provider-agnostic change handling in mobile client applications in which system 100 may operate. Mobile application 105 may be installed on any of the client compute devices 205. Installation of the mobile application 105 causes the client compute devices 205 to include data-provider-agnostic change handling logic. The client compute devices 205 may include devices such as a server 210, a workstation 215, a laptop 220, a smart phone 225, a tablet computer or personal digital assistant (PDA) 230, or other computing device. The client compute devices 205 are connected to an electronic communication network 235, such as the Internet, by wired or wireless connections. The network 235 is further connected to cloud application infrastructure 240 by wired or wireless connections. The cloud application infrastructure includes one or more servers 245 and one or more data storage devices 250, each interconnected by a local network 255.

In one embodiment, the features shown and described with reference to FIG. 1 as belonging to the client side 105 are implemented by one or more client compute devices 205, and the features shown and described as belonging to the server side 135 are implemented by the cloud application infrastructure.

In one embodiment, the servers 245 may be configured as a stack to execute the functionality of remote service providers 131. For example, one or more remote service providers 131 may be implemented as a container, or the one or more remote service providers 131 are components of a web application implemented as a container. Here, the servers 245 are configured as a stack for executing the containerized remote service providers 131. Or, for example, one or more remote service providers 131 may be implemented on virtual machines, or the one or more remote service providers are components of a web application that may be implemented on virtual machines. Here, the servers 245 are configured as a stack for hosting the virtual machines implementing the remote service providers 131. Or, in another example, one or more remote service providers may be executed directly by one or more of the servers 245.

The storage devices 250 may include solid-state memory drives, hard drive discs, network attached storage (NAS) devices, or other storage devices. In one embodiment, the storage devices 250 are components of servers 245. In one embodiment, data structures associated with data stores 165 are hosted by storage devices 250.

—Example Data-Provider-Agnostic Change Specification—

In one embodiment, a data object may be a row object that represents a row in a table data structure. The row object may include one or more attributes. A row object may also include one or more links to a "child," or collection of one or more additional row objects subordinate to the higher-level row object. When a row object is instantiated, it is provided with a definition that indicates a number of and description for each attribute, and initial values, if available, for each attribute.

For each attribute in the row object, the row object includes an original value for the attribute and an update value for the attribute. Data initially retrieved by the mobile application 110 from data store 165 on the server side 135 of the system 100 is stored as one or more instances of the row object in local storage by persistence manager 125. The values of the attributes retrieved from the data store 165 are stored as the original value for each attribute of the row object instance. The mobile application 110 may manipulate the values of one or more attributes in the row object instance, for example in response to user inputs through user interface 115. The mobile application 110 may even add attributes, delete attributes, or delete entire row object instances. The changes to the row object instance are stored as the update value for the attribute. The mobile application 110 may save or commit changes to the row object instance by executing a "save" or "commit" function to indicate that the changes should be applied to the row object.

For example, where an original value of an attribute is changed by the mobile application 110, the update value of the attribute will store the change. Any previous update value will be overwritten by the change. In another example, where the original value is to be deleted, a null or blank value may be stored in the update value. In another example where the attribute itself is to be deleted, the update value for the attribute may be changed to a special value indicating the deletion. In another example where the entire row object instance is to be deleted, an attribute that is a unique key for the row object instance may be changed to a special value indicating the deletion. Other methods of tracking the original and updated values of the row object instance may also be employed.

In one embodiment, execution of the "save" or "commit" function for a row object instance initiates execution of the change data constructor 175 on that row object instance, and on all child row object instances linked from that row object instance. The change data constructor 175 parses and compares the original and update values of all attributes in the row object instance. The change data constructor 175 generates a data-provider-agnostic change object instance describing all changes to the row object instance.

In one embodiment, the change data constructor 175 may be applied to other data objects, such as objects representing tables, columns of tables, or other data structures.

FIG. 3 illustrates one embodiment of a schema 300 for a data-provider-agnostic change object associated with data-provider-agnostic change handling in mobile client applications. The change object schema 300 includes an attribute entry 305 of all changed attributes (if any) in a row object instance, as shown at line 02, column 06 through line 05, column 26 of the schema 300. A change object may include 0 to n attributes, as indicated at line 02, columns 06-24 of the schema 300. The change object schema 300 describes the changes to those attributes.

The change object schema 300 also includes a child entry 310 of all changed children (if any) of the row object instance, as shown at line 06, column 06 through line 14, column 22 of the schema 300. A change object may also include 0 to m children, as indicated at line 06, columns 06-19 of the schema 300. The change object schema 300 describes the changes to attributes of the children. The change object describes these changes in a format that is data-provider-agnostic and data-object-agnostic.

The change object schema 300 includes an attribute name 315 for each attribute entry 305. The attribute name 315 is the name of the changed row object attribute for which the attribute entry 305 is generated. In one embodiment, the change data constructor 175 generates the attribute entry 305 when generating the change object instance for the row object instance. The change data constructor 175 parses the row object instance to identify the name of the changed row object attribute. The change data constructor 175 adds the identified name to the change object instance as the attribute name 315 of the attribute entry 305 for the changed row object attribute, as shown at line 02, columns 06 through 18 of the schema 300.

The attribute entry 305 includes a type of change 320 indicating the nature of the change to the changed row object attribute, as shown at line 03, columns 31-66 of the schema 300. The type of change 320 may be one of "updated," "deleted," or "created." In one embodiment, the change data constructor provides the type of change 320 when generating the change object instance for the row object instance. The change data constructor 175 parses the update value of the changed attribute to identify the type of change made to the changed row object attribute. The change data constructor 175 adds the identified type to the change object instance as the type of change 320 as shown at line 03, columns 31-66 of the schema 300.

The type "updated" means that the original value and the update value of the changed attribute differ, indicating a change in value for that attribute. Where the type of change is the type "updated," the attribute entry 305 further includes a value 325 reflecting the update value of the changed attribute, as shown at line 04, columns 31-48 of the schema 300. In one embodiment, the change data constructor 175 extracts the value 325 when generating the change object instance for the row object instance. The change data constructor 175 parses the update value of the changed row object attribute to identify its value. The change data constructor 175 adds the identified value to the change object instance as the "new value" for the value 325, as shown at line 04, columns 31-48 of the schema 300.

The type "created" means that the changed attribute has been added to the row object instance. Where the type of change is the type "created," the attribute entry 305 further includes a value 325 reflecting the update value of the changed attribute (if provided), as shown at line 04, columns 31-48 of the schema 300. In one embodiment, when generating the change object instance for the row object instance, the change data constructor 175 determines whether there is an update value of the changed (newly created) row object attribute. If so, the change data constructor 175 parses the update value of the changed (newly created) attribute to identify its value and adds the identified value to the change object instance as the "new value" for the value 325, as shown at line 04, columns 31-48 of the schema 300. In a special case, where the attribute name 315 indicates a unique identifier or key for the attribute, the type "created" means that the entire row object instance has been newly created. In one embodiment, the change data constructor 175 may parse the name of the changed row object attribute or the attribute name 315 to determine if the special "row instance creation" case applies.

The type "deleted" means that the attribute named at 315 has been removed from the row object instance. In a special case, where the attribute name 315 indicates a unique identifier or key for the attribute, the type "deleted" means that the entire row object instance has been deleted. In one embodiment, the change data constructor 175 may parse the name of the changed row object attribute or the attribute name 315 to determine if the special "row instance deletion" case applies.

The change object schema 300 includes a child name 330 (or top-level attribute) for each child entry 310. The child name 330 is the name of the changed row object child for which the child entry 310 is generated. In one embodiment, the change data constructor generates 175 the child entry 310 when generating the change object instance for the row object instance. The change data constructor 175 parses the row object instance to identify the name of the changed row object child. The change data constructor 175 adds the identified name to the change object instance as the child name 330 of the child entry 310 for the changed row object child, as shown at line 06, columns 06-14 of the schema 300. The change data constructor 175 also adds a type of structure 335 indicating that the child 310 is a child structure, and not an attribute structure, as shown at line 07, columns 26-39 of the schema 300.

Each child entry 310 includes a collection of sub-objects or "children" 340 associated with the row object, as shown at line 8, column 26 through line 13, column 36 of the schema 300. The association between the row object and the children may be described as "tightly coupled" as the information stored by the children may not be meaningful if separated from the row object. For example, children such as line items for a purchase order make no sense outside of the context of a row object instance describing the purchase order, and children such as address rows are not informative outside of the context of a row object instance describing a contact.

Each member of the collection of children 340 has a change type 345 (similar to type of change 320), a primary key 350, and a listing of changes 355. In one embodiment, the change data constructor 175 parses the row object instance to identify the change type and primary key of each member of the collection of children 340. The change data constructor 175 adds the identified change type to the change object instance as the change type 345 as shown at line 09, columns 41-74 of the schema 300. The change data constructor 175 adds the identified primary key to the change object instance as the primary key 350 as shown at line 10, columns 41-68 of the schema 300. The change data constructor 175 uses the primary key value 350 to retrieve the sub-rows (members of the collection of children 340) from local storage, for example by requesting them by primary key from persistence manager 125. The change data constructor 175 then parses the retrieved sub-rows for changes as described above to create a description of the changes to the sub-row 355. This may be a change object following the format of the schema 300 for the sub-row, as noted at line 11, column 41 through line 12, column 78 of the schema 300. This creation of change object instances for children (sub-rows) may occur recursively through successive layers of children until a sub-row with no further children is reached.

The change object is data-provider-agnostic because it contains no particular details of a provider definition for any service provider to which the change may eventually be directed, and captures a description of the actions performed by the user on the object, rather than merely a description of what the service provider will require for an update. Thus, the change object can be routed to any service provider 131 through the service provider's respective data provider 130 losslessly. This enables "offline write" or "deferred write access" through multiple service providers. This also enables "offline write" or "deferred write access" when a provider definition is modified before write access resumes.

The change object is data-object-agnostic because it contains no particular details of data object definition for the instance of data object it is describing. Thus, the change object can support changes to the definition describing the row object instance. For example the change object enables the addition or deletion of attributes themselves, and not just updating or deleting values.

FIG. 4 illustrates an example data-provider-agnostic change object instance 400 describing various changes made to an example row object instance. The example row object instance and the changes to that example row object instance described by the change object instance 400 are intended to illustrate various features described herein.

The example change object instance 400 is a record of changes performed on the example row object by the mobile application 110. The changes as recorded can subsequently be read and translated by a data provider 130 to a format that will instruct a corresponding remote service provider 131 to effect the recorded changes in data store 165. The changes to the example row object described by the example change object instance 400 are as follows:

At line 02 405, an "SrNumber" attribute is deleted from the example row object instance.

At line 03 410, a "Title" attribute in the example row object instance is updated to have a value of "new title".

At line 04 415, an "ABC" attribute is added to the example row object instance and assigned a value of "123".

Lines 05 through 33 420 describe operations on a child set called "contacts".

At lines 08 through 15 425, a first child object instance with a primary key of "111" is updated. At line 12 430, a "JobTitle" attribute of the first child object instance is updated to have a value of "New Title". At line 13 435, an "XYZZY" attribute is added to the first child object instance and assigned a value of "345".

At lines 16 through 22 440, a second child object instance with a primary key of "222" is updated. At line 20 445, the "PhoneNumber" attribute is deleted from the second child object instance. Note that while the type of action on the second child object instance is "updated," and not "deleted," even though the change delete the "PhoneNumber" attribute from the second child object instance.

As also shown with reference to line 31 450 below, a "deleted" type of action operates to delete the object instance.

At lines 23 through 29 455, a third child object instance with a primary key of "777" is created. At line 27 460, a "MemberID" attribute of the third child object instance is updated to have a value of "777". At line 28 460, a "Title" attribute of the third child object instance is updated to have a value of "Support Level 1".

At line 31 450, a fourth child object instance having a primary key of 123 is deleted.

Thus, in one embodiment, the change object (which may be described as the agnostic syntax of the description of the action on the data object) includes, for each attribute of the data object that the action changes, (i) an indication that the change to that attribute is one of an "update," "delete," or "create" action, and (ii) where the change is an "update" or "create" action, an indication of the new value for that attribute. The change object may also include, for each child object of the data object that the action changes, (i) an indication that the child object is a child object, (ii) an indication that the change to the child object is one of an "update," "delete," or "create" action; (iii) an indication of the value of a primary key for the child, and (iv) an indication of the changes to that child object. Here, the indication of the changes may be described using the agnostic syntax.

—Example Method for Data-Provider-Agnostic Change Handling—

In one embodiment, each step of computer-implemented methods described herein may be performed by a processor (such as processor 910 as shown and described with reference to FIG. 9) of one or more computing devices (i) accessing memory (such as memory 915 and/or other computing device components shown and described with reference to FIG. 9) and (ii) configured with logic to cause the system to execute the step of the method (such as unmet demand minimization logic 930 shown and described with reference to FIG. 9). For example, the processor accesses and reads from or writes to the memory to perform the steps of the computer-implemented methods described herein. These steps may include (i) retrieving any necessary information, (ii) calculating, determining, generating, classifying, or otherwise creating any data, and (iii) storing any data calculated, determined, generated, classified, or otherwise created. References to storage or storing indicate storage as a data structure in memory or storage/disks of a computing device (such as memory 915, or storage/disks 935 of computing device 905 or remote computers 965 shown and described with reference to FIG. 9). In one embodiment, the processor is the signal processing and/or control circuits 1020 of a mobile device, such as mobile device 1000 as shown and described with reference to FIG. 10.

In one embodiment, each subsequent step of a method commences in response to parsing a signal received or stored data retrieved indicating that the previous step has been performed at least to the extent necessary for the subsequent step to commence. Generally, the signal received or the stored data retrieved indicates completion of the previous step. Each step of a method may include multiple sub-steps, which may or may not be described herein.

In one embodiment, the steps of the methods described herein, are performed by a client compute device 205, (as shown and described with reference to FIG. 2). In one embodiment, client compute device 205 is a special purpose computing device (such as computing device 905) configured with data-provider-agnostic change handling logic.

Figure 5:
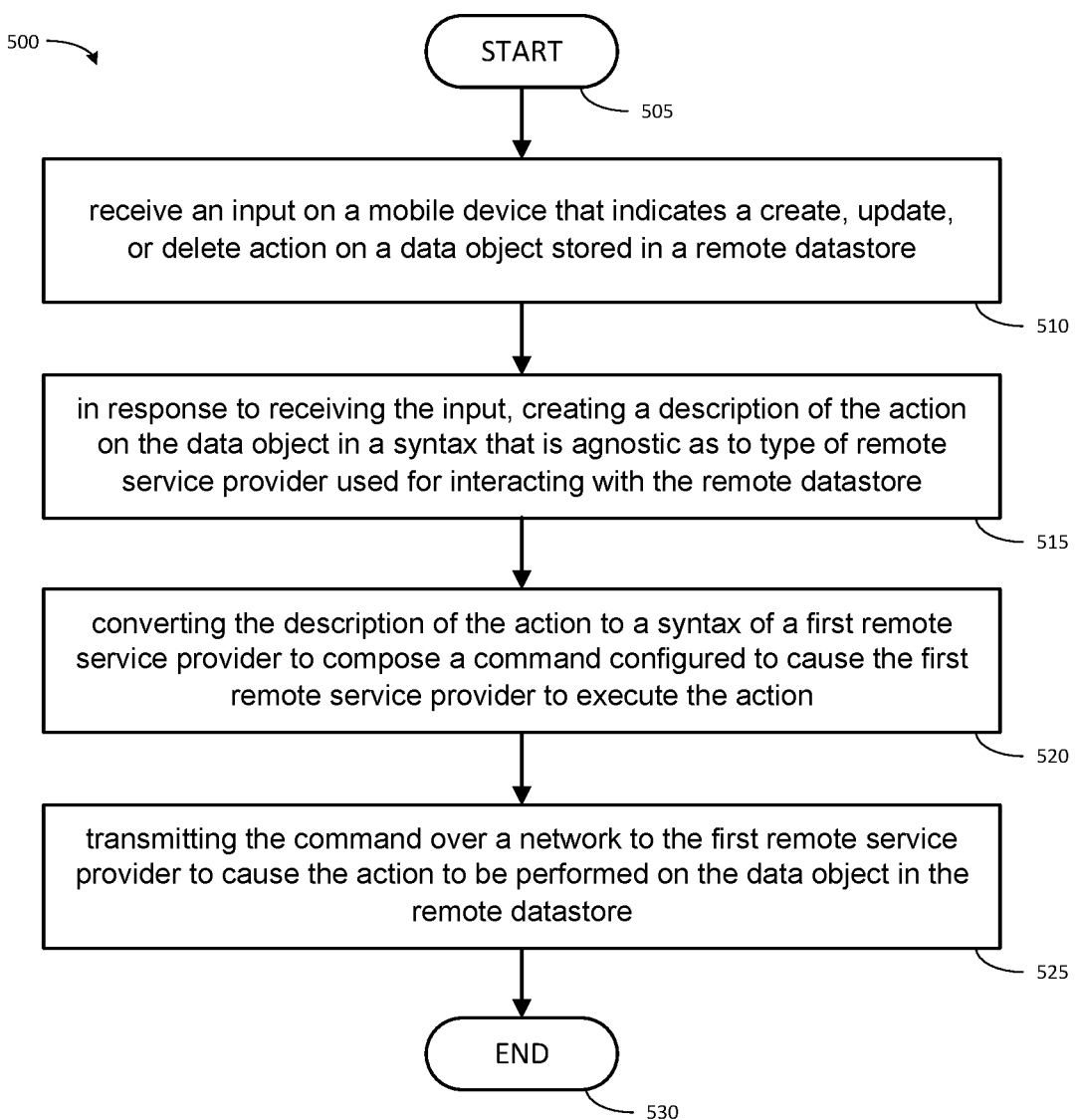
FIG. 5 illustrates one embodiment of a method associated with data-provider-agnostic change handling in mobile client applications.

FIG. 5 illustrates one embodiment of a method 500 associated with data-provider-agnostic change handling in mobile client applications. The method 500 may be initiated based on various triggers, such as receiving a signal over a network or parsing stored data indicating that (i) a user (or administrator) of system 100 has initiated method 500, (ii) a user of the mobile application 110 has initiated a "save changes" or "commit changes" operation, (iii) the client compute device 205 (executing the mobile application 110) has no network connectivity or poor network connectivity to the cloud application infrastructure 240, or (iv) one or more remote service providers 131 associated with mobile application 110 have low availability or no ability to process requests. The method 500 initiates at START block 505 in response to parsing a signal received or stored data retrieved and determining that the signal or stored data indicates that the method 500 should begin. Processing continues to process block 510.

At process block 510, the processor receives an input on a mobile device that indicates a create, update, or delete action on a data object stored in a remote datastore.

In one embodiment, the processor of the client compute device 205 accepts one or more inputs received through the user interface 115 that describe one or more create, update, or delete operations on the data object. The data object may be associated with the application 110. The data object may be a particular instance of a row object.

In one embodiment, the processor parses the inputs to identify the create, update, or delete operation, the attribute of the data object to be created, updated or deleted, and a value for that attribute, if any value is provided. (In one embodiment, multiple attributes of the data object are to be created, updated, and/or deleted based on the inputs. The steps described regarding a single attribute may be applied for multiple attributes of the data object.) The processor applies the identified create, update, or delete operation to a local copy of the data object stored locally on client compute device 205.

For example, where the operation is an update operation, the processor writes a value for the attribute to an update field for that attribute in the local copy of the data object. Or, for example, where the operation is a create operation, the processor appends the attribute to be created to the data object, and writes a value for the attribute to the update field for that attribute. Or, in another example, where the operation is a delete operation, the processor writes a special value indicating the deletion of the attribute to the update field for that attribute.

In one embodiment, the processor parses the inputs and determines that an entire data object is to be created. The processor creates a local instance of the data object stored locally on client compute device 205, and writing any values for the attributes detected in the inputs to the update fields for the respective attributes. The processor writes a new primary key to the update field for the primary key attribute.

In one embodiment, the processor parses the inputs and determines that an entire data is to be deleted. The processor writes a special value indicating the deletion of the primary key (or unique identifier) to the update field for the primary key.

In one embodiment, the processor performs interactions with local storage, including writes to the update fields, by executing one or more functions of the persistence manager 125.

Once the processor has thus completed receiving an input on a mobile device that indicates a create, update, or delete action on a data object stored in a remote datastore, processing at process block 510 completes, and processing continues to process block 515.

At process block 515, in response to receiving the input, the processor creates a description of the action on the data object in a syntax that is agnostic as to type of remote service provider used for interacting with the remote datastore.

In one embodiment, the processor of the client compute device parses an input indicating that the changes to the data object indicated by the inputs are to be saved or committed. In response, the processor parses the local copy of the data object to identify values stored in an original field and the update field for each attribute. The processor compares the update field value with the original field value for each attribute. Where the values differ, the processor generates a description of the change between the original and update field values for the attribute and writes it to a data-provider-agnostic change object for the data object in local storage. The change object is specific to the data object. In one embodiment, the processor performs the creation of the change object by executing one or more functions of the change data constructor 175.

For example, where the attribute is the primary key and the update field value for that attribute is the special value indicating deletion, the change data constructor 175 will write a description indicating that a type of change is "deleted" for a primary key of the original field value, similar to the description shown at line 31 450 of example change object instance 400. Or, for example, where the attribute is not the primary key and the update field value is the special value indicating deletion, the change data constructor 175 will write a description indicating that the type of change is "deleted" for that attribute, similar to the description shown at line 02 405 of example change object instance 400. Or, in another example, where the update field value is not the special value indicating deletion, but differs from the original field value, the change data constructor 175 will write a description indicating that the type of change for that attribute is "updated," and that the value for that attribute is the update field value, similar to the description shown at line 03 410 of example change object instance 400. Or, in yet another example where the attribute is not the primary key, the original field value is NULL or otherwise indicates that there was no prior value for this attribute, and the update field value is populated, the change data constructor 175 will write a description indicating that the type of change for the attribute is "created," and that the value for that attribute is the update field value. Or, in a further example, where the attribute is the primary key, the original field value is NULL or otherwise indicates that there was previously no primary key, and the update field value is populated, the change data constructor 175 will write a description indicating that the type of change is "created" for a primary key of the update field value.

In one embodiment, the processor determines that a value stored in an update field of an attribute of the local copy of the data object is a pointer, link, or other connection to one or more child data structures. The processor parses the attribute to determine the location(s) of the child data structure(s), and retrieves them from local storage. The processor then parses the child data structure(s) to determine if any changes have been made to them. If so, the change data constructor 175 will write a child entry in the change data object indicating that the local copy of the data object has child data structure(s), similar to the child entry shown at lines 05 through 33 420 of example change object instance 400. This child entry may include a top-level attribute name for the child structures, such as the name "contacts" shown at line 05 of example change object instance 400. This child entry may include a type of structure indicating that the child entry is a child structure, and not an attribute structure, for example as shown at line 06 of example change object instance 400. The child entry may include a type of change for a child data structure included in the child entry, and a primary key to identify the child data structure included in the child entry, for example as is shown at lines 09 and 10 of example change object instance 400. The child entry may include a listing of changes to the attributes of the child data structure, recursively following the same schema 300 as the parent change object, for example as shown at lines 12 430 and 13 435 of example change object instance 400.

Once the processor has thus completed creating a description of the action on the data object in a syntax that is agnostic as to type of remote service provider used for interacting with the remote datastore in response to receiving the input, processing at process block 515 completes, and processing continues to process block 520.

At process block 520, the processor converts the description of the action to a syntax of the first remote service provider to compose a command configured to cause a first remote service provider to execute the action.

In one embodiment, the processor of the client compute device 205 has received one or more definitions for the data types accepted by a first remote service provider, such as remote REST provider 151, and a copy of the syntax for interacting with the first remote service provider. These definitions and syntax are maintained in local storage by a local first data provider corresponding to the first remote service provider, such as REST data provider 150. Each pairing of data provider 130 and remote service provider 131 may have definitions and syntax unique to that pair.

In one embodiment, where the type of change is an update, the processor searches the definitions for a definition corresponding to a data type of the local copy of the row object. The processor then searches that definition for the attribute name of each attribute entry listed in the change object in turn. As the attribute name is found in the definition, the processor accesses the syntax to compose an instruction for that attribute entry in the to give effect to the changes recorded by that attribute entry. The processor will compose an electronic message according to the syntax for the "update" type change to cause the first remote service provider to assign the new value to the attribute of the data object in the data store 165.

For example, in response to parsing the attribute entry for a "Title" attribute shown at line 03 410 of example change object instance 400, the processor will search the definition corresponding to this particular type of row object for a "Title" attribute. The processor will retrieve the syntax for an "update" type change operation. The processor will compose an electronic message according to the syntax for the "update" type change to cause the first remote service provider to assign the value "New Title" to a title attribute of the data object in the data store 165.

In one embodiment, where the type of change is a create, the processor retrieves the syntax for an "create" type change operation. The processor will compose an electronic message according to the syntax for the "create" type change to cause the first remote service provider to create a new attribute of the data object (or, in a special case, create an entire new data object) in the data store 165.

In one embodiment, where the type of change is a delete, the processor retrieves the syntax for a "delete" type change operation. The processor will compose an electronic message according to the syntax for the "delete" type change to cause the first remote service provider to delete an attribute of the data object (or, in a special case, delete the entire data object) in the data store 165.

For each type of change operation that may be indicated by the change object, the semantics of creating the electronic message are governed by the definition of the data type for the data object. Further, whether a field is mandatory, locked for editing, not delete-able, and whether a field may be added to the data object are also governed by the definition of the data type.

In one embodiment, the processor performs the composition of the electronic message by executing one or more functions of a data provider 130.

In one embodiment, the processor updates the syntax and/or the definitions. For example, the processor downloads the syntax and/or the definitions in response to determining that (i) network connectivity to the first remote service provider is restored, or (ii) the first remote service provider has resumed availability to process transactions. In one example, the processor may do so when it detects that a new version of the definitions or of the syntax was implemented by the first remote service provider during the network connectivity interruption or unavailability of the service provider.

In one embodiment, the syntax of the first remote service provider is stored in the mobile device, further comprising retrieving a description of semantics for a type of the data object from the first remote service provider. Converting the description of the action to a syntax of the first remote service provider is based on the retrieved description of semantics.

Once the processor has thus completed converting the description of the action to a syntax of the first remote service provider to compose a command configured to cause a first remote service provider to execute the action, processing at process block 520 completes, and processing continues to process block 525.

At process block 525, the processor transmits the command over a network to the first remote service provider to cause the action to be performed on the data object in the remote datastore.

In one embodiment, the processor of the client compute device 205 retrieves the generated message from local memory using a first data provider, addresses it to the first remote service provider corresponding to the first data provider, and sends it over the network as the command to the first remote service provider to cause the action to be performed on the data object in the remote datastore.

Once the processor has thus completed transmitting the command over a network to the first remote service provider to cause the action to be performed on the data object in the remote datastore, processing at process block 525 completes, and processing continues to END block 530, where method 500 ends.

In response to receiving the command, the first remote service provider parses the command, and composes a database command to effect the action on the data object in the data store, such as in data store 165. The database command may be composed in structured query language (SQL) or other language for interacting with databases such as relational databases. The first remote service provider transmits the database command to data store 165, which executes the action on the data object.

—Application to Deferred Write Access Situations—

Figure 6:
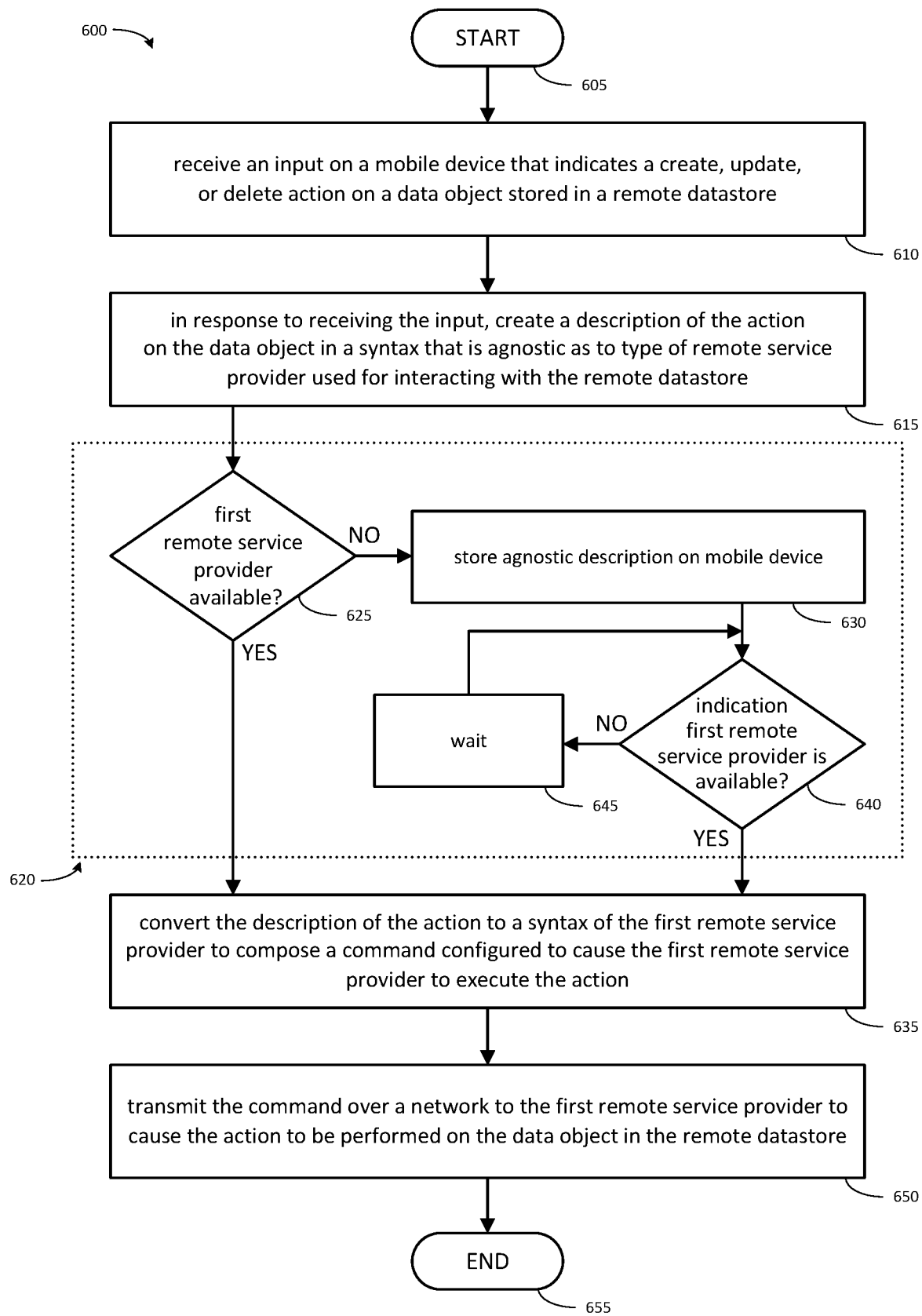
FIG. 6 illustrates one embodiment of a method associated with deferred write access using data-provider-agnostic change handling in mobile client applications.

FIG. 6 illustrates one embodiment of a method 600 associated with deferred write access using data-provider-agnostic change handling in mobile client applications. The method 600 may be initiated based on various triggers, such as receiving a signal over a network or parsing stored data indicating that (i) a user (or administrator) of system 100 has initiated method 600, (ii) a user of the mobile application 110 has initiated a "save changes" or "commit changes" operation, (iii) the client compute device 205 (executing the mobile application 110) has no network connectivity or poor network connectivity to the cloud application infrastructure 240, or (iv) one or more remote service providers 131 associated with mobile application 110 have low availability or no ability to process requests. The method 600 initiates at START block 605 in response to parsing a signal received or stored data retrieved and determining that the signal or stored data indicates that the method 600 should begin. Processing continues through process blocks 610 and 615 into deferred write access loop 620. Process blocks 610 and 615 execute in a similar manner to that described for process blocks 510 and 515, respectively, as shown and described with respect to FIG. 5.

Processing continues at decision block 625. In one embodiment, at decision block 625, the processor of client compute device 205 detects whether a first remote service provider is unavailable. For example, the processor may ping the internet protocol (IP) address of the server(s) 245 hosting the first remote service provider to determine the network latency between the client compute device 205 and the servers 245. The processor then compares the detected network latency to a threshold that indicates that the network connection between the client compute device 205 and the servers 245 is slow, poor, or otherwise limited. In another example, the processor may detect that the network is disconnected between the client compute device 205 and the servers 245 by pinging the IP address of the server(s) 245 and determining that no response is received from the servers. In another example, the processor may detect that the first remote service provider has low or no availability by receiving and parsing a message from the first remote service provider that it is offline or busy. If the threshold is exceeded, or the network is disconnected, or the first remote service provider reports that it is down or busy (has a high processing load), the first remote service provider is unavailable (NO), and processing proceeds to process block 630. Otherwise, the first remote service provider is available (YES) and processing continues to process block 635.

At process block 630, the processor stores the description of the action on the mobile device. In one embodiment, the processor executes the persistence manager 125 to write a change object to local memory. Processing at process block 630 completes and proceeds to decision block 640.

At decision block 640, the processor determines whether it has received an indication that the first remote service provider is available in a manner similar to decision block 625. For example, the processor may ping the server(s) 245 and determine that the network latency has fallen below the threshold. Or, the processor may ping the server(s) 245 and determine that the network connection has been re-established. Or, the processor may receive and parse a message from the first remote service provider that it is available or no longer offline or busy. If the processor receives any of these indications (YES), the first remote service provider is available and processing continues to process block 635. Otherwise (NO), the processing continues to process block 645. At process block 645, the processor waits for a set time interval, for example, one to ten minutes, before returning to decision block 640 to determine whether there is an indication that the first remote service provider is available. This has the effect of delaying the composition of the command described in process block 635 until after an indication that the first remote service provider is available is received by the mobile device.

Processing continues through process blocks 635 and 650 to end block 655, where method 600 ends. Process blocks 635 and 650 execute in a similar manner to that described for process blocks 520 and 525, respectively, as shown and described with respect to FIG. 5.

—Application to Multiple Remote Service Providers—

Figure 7:
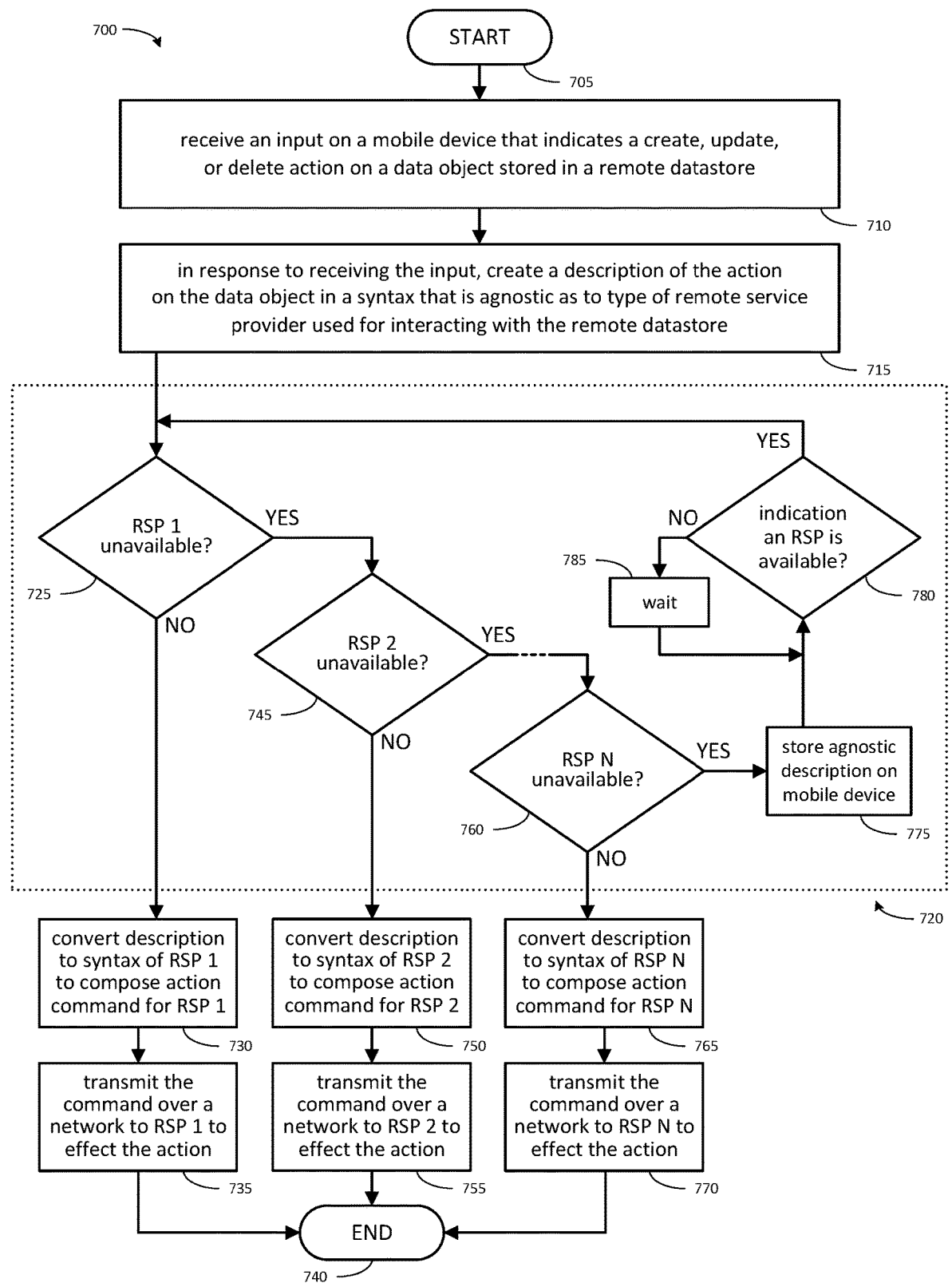
FIG. 7 illustrates one embodiment of a method associated with deferred write access through multiple remote service providers using data-provider-agnostic change handling in mobile client applications.

FIG. 7 illustrates one embodiment of a method 700 associated with deferred write access through multiple remote service providers using data-provider-agnostic change handling in mobile client applications. The method 700 may be initiated based on various triggers, such as receiving a signal over a network or parsing stored data indicating that (i) a user (or administrator) of system 100 has initiated method 700, (ii) a user of the mobile application 110 has initiated a "save changes" or "commit changes" operation, (iii) the client compute device 205 (executing the mobile application 110) has no network connectivity or poor network connectivity to the cloud application infrastructure 240, or (iv) one or more remote service providers 131 associated with mobile application 110 have low availability or no ability to process requests. The method 700 initiates at START block 705 in response to parsing a signal received or stored data retrieved and determining that the signal or stored data indicates that the method 700 should begin. Processing continues through process blocks 710 and 715 into deferred write access loop 720. Process blocks 710 and 715 execute in a similar manner to that described for process blocks 510 and 515, respectively, as shown and described with respect to FIG. 5.

Processing continues at decision block 725. In one embodiment, at decision block 725, the processor of client compute device 205 detects whether a first remote service provider is unavailable, by, for example, performing a similar analysis to that performed at decision block 625 regarding the first remote service provider, as shown and described with reference to FIG. 6. If the first remote service provider is available (NO), processing proceeds through process blocks 730 and 735 to end block 740, where method 700 ends. Process blocks 730 and 735 execute with respect to the first remote service provider in a similar manner to that described for process blocks 520 and 525, respectively, as shown and described with respect to FIG. 5.

Referring again to decision block 725, if the first remote service provider is unavailable (YES) processing continues to decision block 745. In one embodiment, at decision block 745, the processor of client compute device 205 detects whether a second remote service provider is unavailable, by, for example, performing a similar analysis to that performed at decision block 625 regarding the first remote service provider, as shown and described with reference to FIG. 6. If the second remote service provider is available (NO), processing proceeds through process blocks 750 and 755 to end block 740, where method 700 ends. Process blocks 750 and 755 execute with respect to the second remote service provider in a similar manner to that described for process blocks 520 and 525, respectively, as shown and described with respect to FIG. 5. Thus, if the first remote service provider is unavailable for any reason, the second remote service provider may handle the changes. In one embodiment, after determining that the first remote service provider is unavailable to receive the command, composing the command is performed in the syntax of the second remote service provider and transmitting the command to the second remote service provider are performed in response to the determination that the first remote service provider is unavailable to receive the command. In one embodiment, the second remote service provider is a different type of provider from the first remote service provider. For example, the first remote service provider may be a remote REST-type service provider 151, while the second remote service provider is a remote elastic-type service provider 156 or other type of remote service provider.

Referring again to decision block 745, if the second remote service provider is unavailable (YES) processing continues to decision block 760. In one embodiment, at decision block 760, the processor of client compute device 205 detects whether an Nth remote service provider is unavailable, by, for example, performing a similar analysis to that performed at decision block 625 regarding the first remote service provider, as shown and described with reference to FIG. 6. If the Nth remote service provider is available (NO), processing proceeds through process blocks 765 and 770 to end block 740, where method 700 ends. Process blocks 765 and 770 execute with respect to the second remote service provider in a similar manner to that described for process blocks 520 and 525, respectively, as shown and described with respect to FIG. 5. Thus, any number of available remote service providers may be included in failover sequence in deferred write access loop 720. The case may therefore be generalized to after determining that the first N−1 remote service providers are unavailable to receive the command, composing the command in the syntax of the Nth remote service provider and transmitting the command to the Nth remote service provider are performed in response to the determination that the N−1 remote service provider is unavailable to receive the command.

Referring again to decision block 760, if the Nth remote service provider is unavailable (YES) processing continues to process block 775. At process block 775, the processor, the processor stores the description of the action on the mobile device, and processing continues at decision block 780. At decision block 780 the processor determines whether there is an indication that any of the first through Nth remote service providers is available. If so (YES), processing returns to decision block 725 to continue using an available remote service provider. If not (NO), processing continues to process block 785, where the process waits for a period of time, and then returns to decision block 780. Process elements 775, 780, and 785 are performed in a similar fashion to that of process elements 630, 640, and 645, as shown and described with reference to FIG. 6.

—Selection Among Multiple Remote Service Providers—

Figure 8:
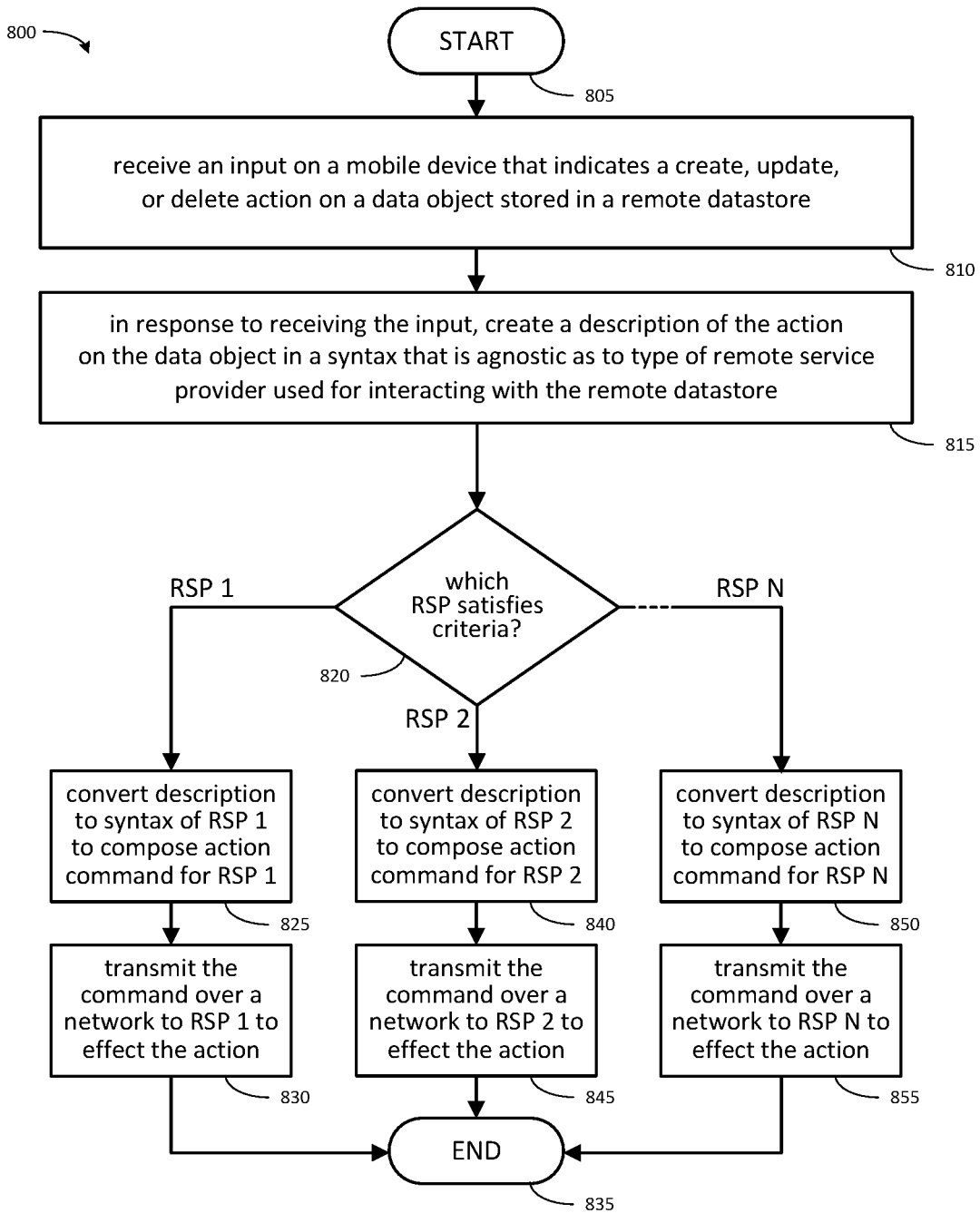
FIG. 8 illustrates one embodiment of a method associated with deferred write access through selectable alternate service providers using data-provider-agnostic change handling in mobile client applications.

FIG. 8 illustrates one embodiment of a method 800 associated with deferred write access through selectable alternate remote service providers using data-provider-agnostic change handling in mobile client applications. The method 800 may be initiated based on various triggers, such as receiving a signal over a network or parsing stored data indicating that (i) a user (or administrator) of system 100 has initiated method 800, (ii) a user of the mobile application 110 has initiated a "save changes" or "commit changes" operation, (iii) the client compute device 205 (executing the mobile application 110) has no network connectivity or poor network connectivity to the cloud application infrastructure 240, or (iv) one or more remote service providers 131 associated with mobile application 110 have low availability or no ability to process requests. The method 800 initiates at START block 805 in response to parsing a signal received or stored data retrieved and determining that the signal or stored data indicates that the method 800 should begin. Processing continues through process blocks 810 and 815 to decision block 820. Process blocks 810 and 815 execute in a similar manner to that described for process blocks 510 and 515, respectively, as shown and described with respect to FIG. 5.

At decision block 820, the processor selects a remote service provider from among a set of more than one remote service providers, each of which have access to the remote datastore. The selection from among the more than one remote service providers, remote service providers one through N, is based on the remote service provider satisfying one or more criteria. The processor retrieves the one or more criteria from local storage. The criteria may be, for example, one or more of (i) current availability of the remote service provider and (ii) complexity of the action to be provided to the remote service provider.

Regarding current availability, the processor may evaluate availability of each of the remote service providers to determine the extent to which each remote service provider is available, in a process similar to that of decision blocks 625 and 640 as shown and described with reference to FIG. 6. The processor compares the relative availability of the remote service providers based on, for example, one or more of network connectivity, network latency, and load on the remote service provider. The processor selects the most available service provider based on the availability metric employed by the processor.

Regarding complexity of the action, remote elastic provider 156 and remote graph query provider 146 may have a performance advantage over remote REST provider 151 or remote XML provider 141. For example, remote graph query provider 146 can process complex unified queries (written in GraphQL), while remote REST provider 151 or remote XML provider 141 may require multiple interactions to accomplish the same result. Also, for example, remote elastic provider 156 can more rapidly process queries because it retains a persistent data store at the server 245, rather than querying data piecemeal from data store 165 in response to interactions with remote REST provider 151 or remote XML provider 141. In one embodiment, the processor evaluates whether the action is complex based on a number of changes included in the action. If the number of changes is below a threshold indicating a simple action, for example, fewer than ten changes, the processor selects a remote service provider for handling simple actions, such as remote REST provider 151 or remote XML provider 141 from among the available remote service providers. If the threshold is met or exceeded, the processor selects a remote service provider capable of handling complex actions, such as remote elastic provider 156 or remote graph query provider 146 from among the available remote service providers.

—Example Use Case—

In one embodiment, the mobile application 110 is an application for presenting and editing purchase orders as part of an e-commerce system. The data store 165 includes many row objects representing purchase orders. An example row object representing an example purchase order is retrieved from data store 165 by mobile application 110 through a data provider and its corresponding remote service provider and stored in local storage of client device 205 on the client side 105 using persistence manager 125. A user of the mobile application 110 enters inputs through user interface 115 to manipulate the example purchase order. The user interface 115 makes the changes to the example row object. The user then selects an option presented by user interface 115 to save or commit the changes made to the example purchase order.

In response to the save or commit operation, the change data constructor 175 parses the changes made to the example row object and records all changes to the example row object in a data-provider-agnostic change object. For example, the changes to the example row may include an update to a "purchaser name" attribute. Also, for example, the changes to the example row may include an update to a "quantity" attribute of a line item from "5" to "10" in the purchase order. The change data constructor 175 generates an attribute entry for the purchaser name attribute updating the purchaser name value to "John Smith" in the change object. The change data constructor 175 also generates a child entry for the top-level attribute line item including an update to the quantity value to "10".

In one embodiment, data manager 170 sends the change object to data provider 150 to convert to a message in the API format for the remote REST provider 151, and transmit the generated message to the remote REST provider 151. In one embodiment, the processor detects that the remote REST service provider 151 is not available (i) due to lack of network connectivity with the server(s) 245 or (ii) high load on the provider 151. If the unavailability of the remote REST service provider 151 is due to the lack of network connectivity, the data manager 170 sends the change object to the persistence manager 125 to be stored locally. Transaction processor 180 will retrieve the change object and re-attempt to convert and transmit when connectivity is restored. If the unavailability of the remote REST provider 151 is due to high load on the provider 151, then the data manager sends the change object to the graph query data provider to convert to a message in the API format for the remote graph query provider 146, and transmit the generated message to the remote graph query provider 146. The remote graph query provider 146 executes the API payload of the message to cause the changes to be applied to the server-side copy of the example row object in the data store 165. Note that the change object may be used universally as a format for local storage and for submission to the data providers.

Cloud or Enterprise Embodiments

In one embodiment, the automated scoping tool 103 and/other systems shown and described herein are a computing/data processing system including a database application or collection of distributed database applications. The applications and data processing system may be configured to operate with or be implemented as a cloud-based networking system, a software-as-a-service (SaaS) architecture, a platform-as-a-service (PaaS) architecture, an infrastructure-as-a-service (IaaS) architecture, or other type of networked computing solution. In one embodiment the cloud computing system 100 is a server-side system that provides at least the functions disclosed herein and that is accessible by many users via computing devices/terminals communicating with the cloud computing system 100 (functioning as the server) over a computer network.

Software Module Embodiments

In general, software instructions are designed to be executed by a suitably programmed processor. These software instructions may include, for example, computer-executable code and source code that may be compiled into computer-executable code. These software instructions may also include instructions written in an interpreted programming language, such as a scripting language.

In a complex system, such instructions are typically arranged into program modules with each such module performing specific tasks, processes, functions, or operations. The entire set of modules may be controlled or coordinated in their operation by an operating system (OS) or other form of organizational platform.

In one embodiment, one or more of the components, functions, methods, or processes described herein are configured as modules stored in a non-transitory computer readable medium. The modules are configured with stored software instructions that when executed by at least a processor accessing memory or storage cause the computing device to perform the corresponding function(s) as described herein.

In one embodiment, one or more of the mobile application 110, the user interface 115, the transaction handler 120, the persistence manager 125, the data providers 130, the remote service providers 131, the data manager 170, the change data constructor 175, and the transaction processor 180 are configured as modules stored in a non-transitory computer readable medium.

Computing Device Embodiment

Figure 9:
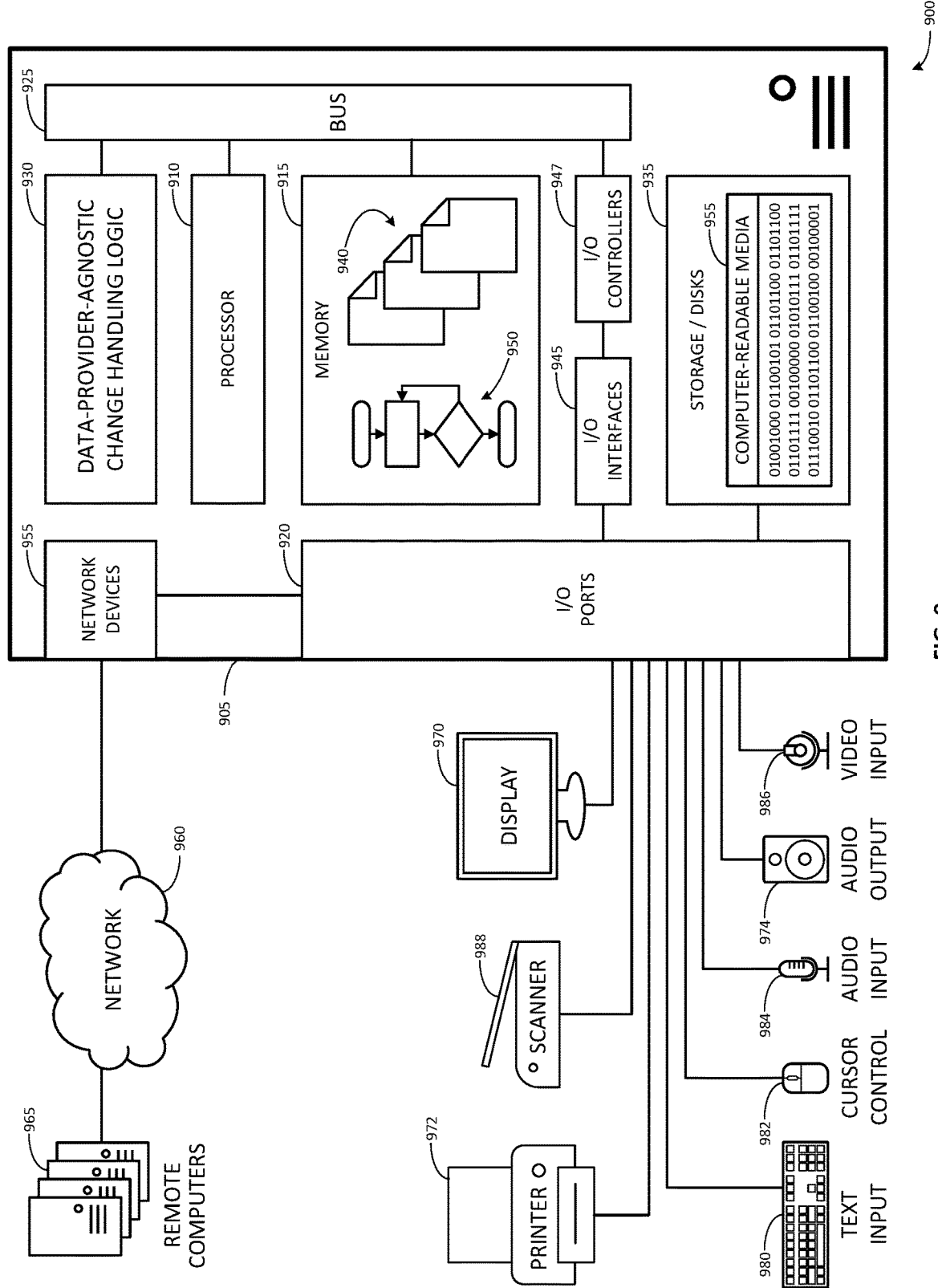
FIG. 9 illustrates an embodiment of a computing system configured with the example systems and/or methods disclosed.

FIG. 9 illustrates an example computing device that is configured and/or programmed with one or more of the example systems and methods described herein, and/or equivalents. The example computing device may be a computer 900 that includes a processor 910, a memory 915, and input/output ports 920 operably connected by a bus 925. In one example, the computer 900 may include data-provider-agnostic change handling logic 930 configured to facilitate data-provider-agnostic change handling in mobile client applications similar to the logic, system, and methods shown and described with reference to shown in FIGS. 1 through 8. In different examples, the logic 930 may be implemented in hardware, a non-transitory computer-readable medium with stored instructions, firmware, and/or combinations thereof. While the logic 930 is illustrated as a hardware component attached to the bus 925, it is to be appreciated that in other embodiments, the logic 930 could be implemented in the processor 910, stored in memory 915, or stored in disk 935.

In one embodiment, logic 930 or the computer is a means (for example, structure: hardware, non-transitory computer-readable medium, firmware) for performing the actions described. In some embodiments, the computing device may be a server operating in a cloud computing system, a server configured in a Software as a Service (SaaS) architecture, a smart phone, laptop, tablet computing device, and so on.

The means may be implemented, for example, as an ASIC programmed to facilitate data-provider-agnostic change handling in mobile client applications. The means may also be implemented as stored computer executable instructions that are presented to computer 900 as data 940 that are temporarily stored in memory 915 and then executed by processor 910.

Logic 930 may also provide means (for example, hardware, non-transitory computer-readable medium that stores executable instructions, firmware) for performing data-provider-agnostic change handling in mobile client applications.

Generally describing an example configuration of the computer 900, the processor 910 may be a variety of various processors including dual microprocessor and other multiprocessor architectures. A memory 915 may include volatile memory and/or non-volatile memory. Non-volatile memory may include, for example, ROM, PROM, and so on. Volatile memory may include, for example, RAM, SRAM, DRAM, and so on.

A storage disk 935 may be operably connected to the computer 900 via, for example, an input/output (I/O) interface (for example, card, device) 945 and an input/output port 920. The disk 935 may be, for example, a magnetic disk drive, a solid state disk drive, a floppy disk drive, a tape drive, a Zip drive, a flash memory card, a memory stick, and so on. Furthermore, the disk 935 may be a CD-ROM drive, a CD-R drive, a CD-RW drive, a DVD ROM, and so on. The memory 915 can store a process 950 and/or a data 940, for example. The disk 935 and/or the memory 915 can store an operating system that controls and allocates resources of the computer 900.

The computer 900 may interact with input/output (I/O) devices via the I/O interfaces 945 and the input/output ports 920. Input/output devices may be, for example, a keyboard, a microphone, a pointing and selection device, cameras, video cards, displays, the disk 935, the network devices 955, and so on. The input/output ports 920 may include, for example, serial ports, parallel ports, and USB ports.

The computer 900 can operate in a network environment and thus may be connected to the network devices 955 via the I/O interfaces 945, and/or the I/O ports 920. Through the network devices 955, the computer 900 may interact with a network. Through the network, the computer 900 may be logically connected to remote computers. Networks with which the computer 900 may interact include, but are not limited to, a LAN, a WAN, and other networks.

Mobile Device Embodiment

Figure 10:
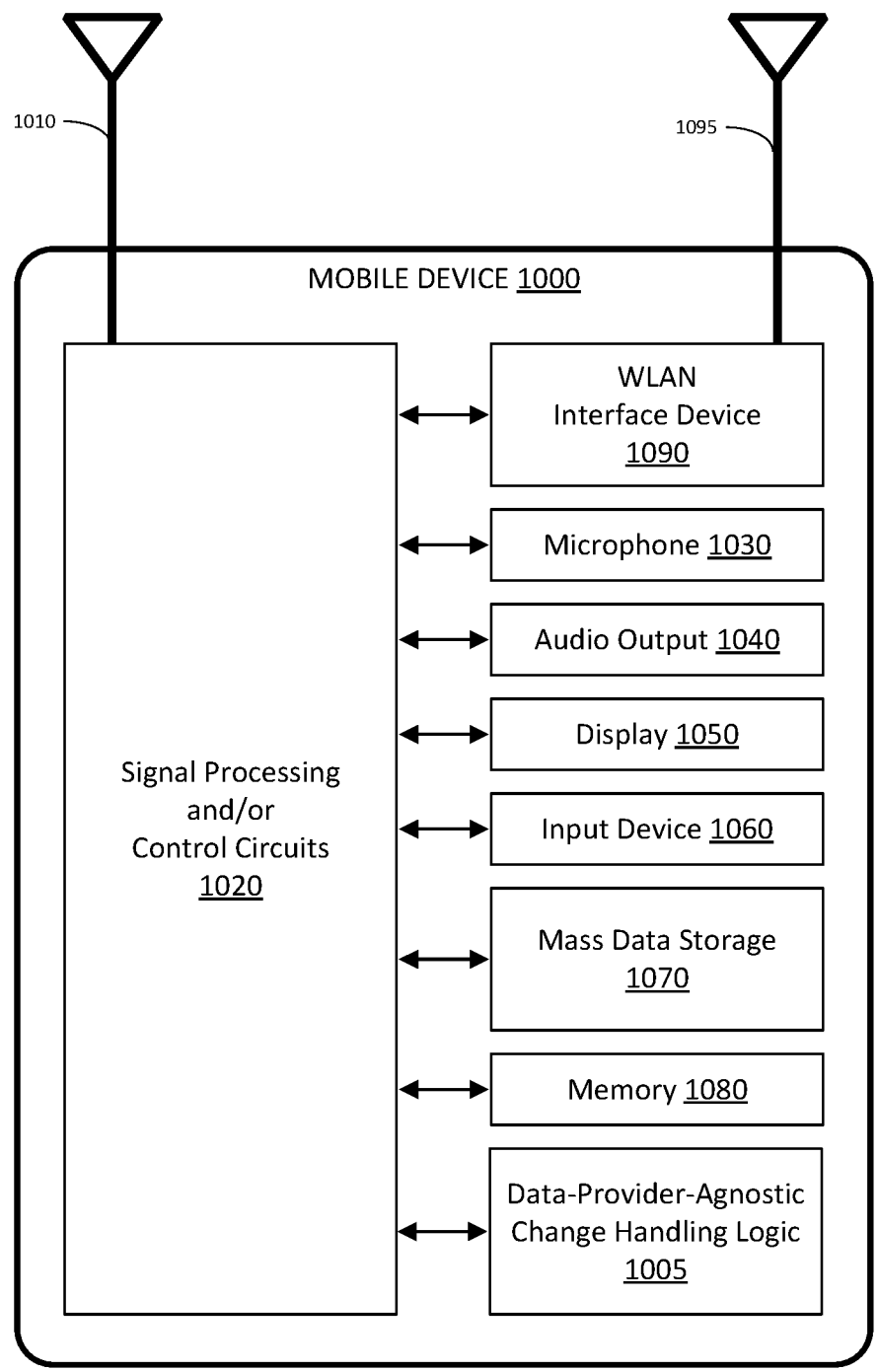
FIG. 10 illustrates an embodiment of a mobile device configured with the example systems and/or methods disclosed.

Referring now to FIG. 10, illustrates an example mobile device 1000 that is configured and/or programmed with one or more of the example systems and methods described herein, and/or equivalents. In one example, the mobile device 1000 may include data-provider-agnostic change handling logic 1005 configured to facilitate data-provider-agnostic change handling in mobile client applications similar to the logic, system, and methods shown and described with reference to shown in FIGS. 1 through 8. Mobile device 1000 may include a cellular antenna 1010. The example embodiment may implement signal processing and/or control circuits, which are generally identified in FIG. 10 at 1020. In some implementations, the mobile device 1000 includes a microphone 1030, an audio output 1040 such as a speaker and/or audio output jack, a display 1050 and/or an input device 1060 such as a keypad, pointing device, voice actuation and/or other input devices. The signal processing and/or control circuits 1020 and/or other circuits (not shown) in the mobile device 1000 may process data, perform coding and/or encryption, perform calculations, format data and/or perform other cellular phone functions.

The mobile device 1000 may communicate with a mass data storage 1070 that stores data in a nonvolatile manner such as in optical and/or magnetic storage devices including, for example, HDDs and/or DVDs. The HDD may be a mini HDD that includes one or more platters having a diameter that is smaller than approximately 1.8 inches. The cellular phone 1000 may be connected to a memory 1080 such as RAM, ROM, low latency nonvolatile memory such as flash memory and/or other suitable electronic data storage. The mobile device 1000 also may support connections with a WLAN via a WLAN network interface 1090. Mobile device 1000 may include a WLAN antenna 1095. In this example embodiment, example systems and methods may be implemented using this WLAN network interface 1090, but other arrangements are also possible.

Definitions and Other Embodiments

In another embodiment, the described methods and/or their equivalents may be implemented with computer executable instructions. Thus, in one embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (SaaS) architecture, a smart phone, and so on). In one embodiment, a computing device is implemented with one or more executable algorithms that are configured to perform any of the disclosed methods.

In one or more embodiments, the disclosed methods or their equivalents are performed by either: computer hardware configured to perform the method; or computer instructions embodied in a module stored in a non-transitory computer-readable medium where the instructions are configured as an executable algorithm configured to perform the method when executed by at least a processor of a computing device.

While for purposes of simplicity of explanation, the illustrated methodologies in the figures are shown and described as a series of blocks of an algorithm, it is to be appreciated that the methodologies are not limited by the order of the blocks. Some blocks can occur in different orders and/or concurrently with other blocks from that shown and described. Moreover, less than all the illustrated blocks may be used to implement an example methodology. Blocks may be combined or separated into multiple actions/components. Furthermore, additional and/or alternative methodologies can employ additional actions that are not illustrated in blocks. The methods described herein are limited to statutory subject matter under 35 U.S.C. § 101.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

ASIC: application specific integrated circuit.
CD: compact disk.
CD-R: CD recordable.
CD-RW: CD rewriteable.
DVD: digital versatile disk and/or digital video disk.
HTTP: hypertext transfer protocol.
LAN: local area network.
RAM: random access memory.
DRAM: dynamic RAM.
SRAM: synchronous RAM.
ROM: read only memory.
PROM: programmable ROM.
EPROM: erasable PROM.
EEPROM: electrically erasable PROM.
SQL: structured query language.
USB: universal serial bus.
XML: extensible markup language.
WAN: wide area network.
WLAN: Wireless LAN A "data structure", as used herein, is an organization of data in a computing system that is stored in a memory, a storage device, or other computerized system. A data structure may be any one of, for example, a data field, a data file, a data array, a data object, a data record, a database, a data table, a table row, a table column, a graph, a tree, a linked list, and so on. A data structure may be formed from and contain many other data structures (for example, a database includes many data records). Other examples of data structures are possible as well, in accordance with other embodiments.

"Computer-readable medium" or "computer storage medium", as used herein, refers to a non-transitory medium that stores instructions and/or data configured to perform one or more of the disclosed functions when executed. Data may function as instructions in some embodiments. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read only memory (ROM), a memory chip or card, a memory stick, solid state storage device (SSD), flash drive, and other media from which a computer, a processor or other electronic device can function with. Each type of media, if selected for implementation in one embodiment, may include stored instructions of an algorithm configured to perform one or more of the disclosed and/or claimed functions. Computer-readable media described herein are limited to statutory subject matter under 35 U.S.C. § 101.

"Logic", as used herein, represents a component that is implemented with computer or electrical hardware, a non-transitory medium with stored instructions of an executable application or program module, and/or combinations of these to perform any of the functions or actions as disclosed herein, and/or to cause a function or action from another logic, method, and/or system to be performed as disclosed herein. Equivalent logic may include firmware, a microprocessor programmed with an algorithm, a discrete logic (for example, ASIC), at least one circuit, an analog circuit, a digital circuit, a programmed logic device, a memory device containing instructions of an algorithm, and so on, any of which may be configured to perform one or more of the disclosed functions. In one embodiment, logic may include one or more gates, combinations of gates, or other circuit components configured to perform one or more of the disclosed functions. Where multiple logics are described, it may be possible to incorporate the multiple logics into one logic. Similarly, where a single logic is described, it may be possible to distribute that single logic between multiple logics. In one embodiment, one or more of these logics are corresponding structure associated with performing the disclosed and/or claimed functions. Choice of which type of logic to implement may be based on desired system conditions or specifications. For example, if greater speed is a consideration, then hardware would be selected to implement functions. If a lower cost is a consideration, then stored instructions/executable application would be selected to implement the functions. Logic is limited to statutory subject matter under 35 U.S.C. § 101.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (for example, processor, operating system, logic, non-transitory computer-readable medium). Logical and/or physical communication channels can be used to create an operable connection.

"User", as used herein, includes but is not limited to one or more persons, computers or other devices, or combinations of these.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or the illustrative examples shown and described. Thus, this disclosure is intended to embrace alterations, modifications, and variations that fall within the scope of the appended claims, which satisfy the statutory subject matter requirements of 35 U.S.C. § 101.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (for example, A or B) it is intended to mean "A or B or both". When the applicants intend to indicate "only A or B but not both" then the phrase "only A or B but not both" will be used. Thus, use of the term "or" herein is the inclusive, and not the exclusive use.

What is claimed is:

1. A computer-implemented method, comprising:
   receiving an input on a mobile device that indicates a create, update, or delete action on a data object stored in a remote datastore accessible through a set of more than one remote service providers, wherein the set has a remote service provider for each of multiple types of web services;
   in response to receiving the input, creating in the mobile device a change object that describes the action on the data object in a syntax that is agnostic as to type of remote service provider used for interacting with the remote datastore;
   converting by the mobile device the description of the action in the change object to a syntax of a first remote service provider for a first type of the multiple types of web service to compose a command specific to the first type of web service and configured to cause the first remote service provider to execute the action; and
   transmitting the command over a network from the mobile device to the first remote service provider to cause the action to be performed on the data object in the remote datastore by the remote service provider.

2. The computer-implemented method of claim 1, further comprising:
   determining that the first remote service provider is unavailable to receive the command;
   storing the change object describing the action on the mobile device; and
   delaying composing the command until after an indication that the first remote service provider is available is received by the mobile device.

3. The computer-implemented method of claim 1, further comprising determining that a second remote service provider for a second type of the multiple types of web service is unavailable to receive the command, wherein composing the command in the syntax of the first remote service provider and not in a second syntax of the second remote service provider and transmitting the command to the first remote service provider are performed in response to the determination that the second remote service provider is unavailable to receive the command.

4. The computer-implemented method of claim 1, further comprising selecting the first remote service provider from among the set of more than one remote service providers, wherein the selection is based on the first remote service provider satisfying one or more criteria.

5. The computer-implemented method of claim 4, wherein the one or more criteria include at least one of (i) current availability of the remote service provider and (ii) complexity of the action.

6. The computer implemented method of claim 1, wherein the agnostic syntax of the description of the action on the data object includes:
for each attribute of the data object that the action changes, (i) an indication that the change to that attribute is one of an "update," "delete," or "create" action, and (ii) where the change is an "update" or "create" action, an indication of the new value for that attribute;
for each child object of the data object that the action changes, (i) an indication that the child object is a child object, (ii) an indication that the change to the child object is one of an "update," "delete," or "create" action; (iii) an indication of the value of a primary key for the child, and (iv) an indication of the changes to that child object, wherein the indication of the changes is described using the agnostic syntax.

7. The computer implemented method of claim 1, wherein the syntax of the first remote service provider is stored in the mobile device, further comprising retrieving a description of semantics for a type of the data object from the first remote service provider, wherein converting the description of the action to a syntax of the first remote service provider is based on the retrieved description of semantics.

8. A non-transitory computer-readable medium storing computer-executable instructions that when executed by at least a processor of a computer cause the computer to:
receive an input on a mobile device that indicates a create, update, or delete action on a data object stored in a remote datastore accessible through a set of more than one remote service providers, wherein the set has a remote service provider for each of multiple types of web services;
in response to receiving the input, create in the mobile device a change object that describes the action on the data object in a syntax that is agnostic as to type of remote service provider used for interacting with the remote datastore;
convert by the mobile device the description of the action in the change object to a syntax of a first remote service provider for a first type of the multiple types of web services to compose a command specific to the first type of web service and configured to cause a first remote service provider to execute the action; and
transmit the command over a network from the mobile device to the first remote service provider to cause the action to be performed on the data object in the remote datastore by the remote service provider.

9. The non-transitory computer-readable medium of claim 8, further comprising instructions that when executed by at least the processor cause the computer to:
determine that the first remote service provider is unavailable to receive the command;
store the change object describing the action on the mobile device; and
delay composing the command until after an indication that the first remote service provider is available is received by the mobile device.

10. The non-transitory computer-readable medium of claim 8, further comprising instructions that when executed by at least the processor cause the computer to determine that a second remote service provider for a second type of the multiple types of web service is unavailable to receive the command, wherein composing the command in the syntax of the first remote service provider and not in a second syntax of the second remote service provider and transmitting the command to the first remote service provider are performed in response to the determination that the second remote service provider is unavailable to receive the command.

11. The non-transitory computer-readable medium of claim 8, further comprising instructions that when executed by at least the processor cause the computer to select the first remote service provider from among the set of more than one remote service providers, wherein the selection is based on the first remote service provider satisfying one or more criteria.

12. The non-transitory computer-readable medium of claim 11, wherein the one or more criteria include at least one of (i) current availability of the remote service provider and (ii) complexity of the action.

13. The non-transitory computer-readable medium of claim 8, wherein the agnostic syntax of the description of the action on the data object includes:
for each attribute of the data object that the action changes, (i) an indication that the change to that attribute is one of an "update," "delete," or "create" action, and (ii) where the change is an "update" or "create" action, an indication of the new value for that attribute;
for each child object of the data object that the action changes, (i) an indication that the child object is a child object, (ii) an indication that the change to the child object is one of an "update," "delete," or "create" action; (iii) an indication of the value of a primary key for the child, and (iv) an indication of the changes to that child object, wherein the indication of the changes is described using the agnostic syntax.

14. The non-transitory computer-readable medium of claim 8, wherein the syntax of the first remote service provider is stored in the mobile device, further comprising instructions that when executed by at least the processor cause the computer to retrieve a description of semantics for a type of the data object from the first remote service provider, wherein converting the description of the action to a syntax of the first remote service provider is based on the retrieved description of semantics.

15. A computing system, comprising:
a processor;
a memory operably connected to the processor;
a non-transitory computer-readable medium operably connected to the processor and memory and storing computer-executable instructions that when executed by at least the processor cause the computing system to:
receive an input on a mobile device that indicates a create, update, or delete action on a data object stored in a remote datastore accessible through a set of more than one remote service providers, wherein the set has a remote service provider for each of multiple types of web services;

in response to receiving the input, create in the mobile device a chance object that describes the action on the data object in a syntax that is agnostic as to type of remote service provider used for interacting with the remote datastore;

convert by the mobile device the description of the action in the change object to a syntax of a first remote service provider for a first type of the multiple types of web service to compose a command specific to the first type of web service and configured to cause the first remote service provider to execute the action; and transmit the command over a network from the mobile device to the first remote service provider to cause the action to be performed on the data object in the remote datastore by the remote service provider.

16. The computing system of claim 15, wherein the non-transitory computer-readable medium of claim further comprises instructions that when executed by at least the processor cause the computing system to determine that the first remote service provider is unavailable to receive the command;

store the chance object describing the action on the mobile device; and delay composing the command until after an indication that the first remote service provider is available is received by the mobile device.

17. The computing system of claim 15, wherein the non-transitory computer-readable medium of claim further comprises instructions that when executed by at least the processor cause the computing system to determine that a second remote service provider for a second type of the multiple types of web service is unavailable to receive the command, wherein composing the command in the syntax of the first remote service provider and not in a second syntax of the second remote service provider and transmitting the command to the first remote service provider are performed in response to the determination that the second remote service provider is unavailable to receive the command.

18. The computing system of claim 15, wherein the non-transitory computer-readable medium of claim further comprises instructions that when executed by at least the processor cause the computing system to select the first remote service provider from among the set of more than one remote service providers, wherein the selection is based on the first remote service provider satisfying one or more criteria that include at least one of (i) current availability of the remote service provider and (ii) complexity of the action.

19. The computing system of claim 15, wherein the agnostic syntax of the description of the action on the data object includes:

for each attribute of the data object that the action changes, (i) an indication that the change to that attribute is one of an "update," "delete," or "create" action, and (ii) where the change is an "update" or "create" action, an indication of the new value for that attribute;

for each child object of the data object that the action changes, (i) an indication that the child object is a child object, (ii) an indication that the change to the child object is one of an "update," "delete," or "create" action; (iii) an indication of the value of a primary key for the child, and (iv) an indication of the changes to that child object, wherein the indication of the changes is described using the agnostic syntax.

20. The computing system of claim 15, wherein the syntax of the first remote service provider is stored in the mobile device, further comprising instructions that when executed by at least the processor cause the computing system to retrieve a description of semantics for a type of the data object from the first remote service provider, wherein converting the description of the action to a syntax of the first remote service provider is based on the retrieved description of semantics.

* * * * *